(12) United States Patent
Smith (10) Patent No.: US 7,389,739 B1
(45) Date of Patent: Jun. 24, 2008

(54) TAILGATE POSITION INDICATION MARKER

(76) Inventor: David O Smith, 15010 Heronglen Dr., Lithia, FL (US) 33547-5853

( * ) Notice: Subject to any disclaimer, the term of this patent is extended or adjusted under 35 U.S.C. 154(b) by 0 days.

(21) Appl. No.: 11/263,632

(22) Filed: Oct. 31, 2005

(51) Int. Cl.
*B60Q 1/30* (2006.01)
*B60R 1/06* (2006.01)

(52) U.S. Cl. ............................ 116/28 R; 280/762

(58) Field of Classification Search ............ 116/28 R, 116/35 R, 209; 40/590, 591, 599; 280/477, 280/762, 770; 296/1.02, 50, 57.1, 76, 186.4, 296/186.5; 16/412, 413, 415; D8/300, 305, D8/307, 308; D10/110, 111
See application file for complete search history.

(56) References Cited

U.S. PATENT DOCUMENTS

| | | | | |
|---|---|---|---|---|
| D41,921 S | * | 11/1911 | Huff | .............................. D8/300 |
| 1,877,428 A | * | 9/1932 | Rensonnet | ..................... 33/264 |
| 3,563,200 A | * | 2/1971 | Grossman | .................. 116/28 R |
| D260,860 S | * | 9/1981 | Doman | ....................... D10/110 |
| D281,061 S | | 10/1985 | Tortolani | |
| 4,811,173 A | * | 3/1989 | Johnson | ....................... 362/540 |
| 4,863,213 A | | 9/1989 | Deaver | |
| 5,076,636 A | | 12/1991 | Buck | |
| D325,331 S | * | 4/1992 | Onstad | ......................... D8/307 |
| 5,210,970 A | * | 5/1993 | Elmer | ........................... 40/591 |
| 5,339,551 A | * | 8/1994 | Elmer | ........................... 40/591 |
| 5,678,505 A | * | 10/1997 | Leung et al. | .............. 116/28 R |
| D387,722 S | | 12/1997 | Fujinaka | |
| 5,784,213 A | * | 7/1998 | Howard | ....................... 359/872 |
| 5,871,254 A | | 2/1999 | Burg | |
| 6,065,423 A | | 5/2000 | Hensel | |
| 6,137,419 A | | 10/2000 | Lennox | |
| 6,247,742 B1 | * | 6/2001 | Boudreaux | .................. 296/57.1 |
| 6,345,587 B1 | * | 2/2002 | Toscano | ....................... 116/30 |
| 6,374,766 B1 | * | 4/2002 | Clark | ......................... 116/28 R |
| D475,314 S | * | 6/2003 | Shockey | ..................... D10/111 |
| 6,789,833 B1 | * | 9/2004 | Alber | .......................... 296/57.1 |
| D522,838 S | * | 6/2006 | Bruce | ........................... D8/307 |
| 7,066,105 B2 | * | 6/2006 | Tal | .............................. 116/28 R |
| 2003/0039126 A1 | * | 2/2003 | Fox | .............................. 362/485 |
| 2004/0094934 A1 | * | 5/2004 | Teague | ......................... 280/477 |
| 2006/0273549 A1 | * | 12/2006 | Dietz | ........................... 280/477 |

* cited by examiner

*Primary Examiner*—R. A. Smith
(74) *Attorney, Agent, or Firm*—Michael I Kroll (57) ABSTRACT

Apparatus 10 discloses a tailgate position indication marker 38 that is mounted to the rear upper portion of a vehicle 14 tailgate 18 and is provided in two embodiments 11, 12. The first embodiment 11 comprises a polymeric structure having a 1½ inch horizontal offset 26 in the center, the bottom 1½ inch long vertical portion 28 of the marker would secure to the tailgate 18 at the top inside edge with two self tapping screws 36 or tape 42. The device 11 extends outward over the top of the tailgate 18 and then angles back upward to serve as a clear visual marker for the truck operator 24 looking backward through the rear window. The second embodiment 12 would be a 3 inch tall upright 30 marker 38 that includes a 1½ inch tall extension or offset 32 at the front bottom side. This variation 12 is mounted from the upper outside edge of an upright tailgate 18.

7 Claims, 14 Drawing Sheets

TAILGATE POSITION INDICATION MARKER

BACKGROUND OF THE INVENTION

1. Field of the Invention

The present invention relates generally to identification markers for pickup truck tailgates and, more specifically, to a tailgate position indication marker that is mounted to the rear upper portion of a vehicle tailgate and is provided in two variations. The first variation comprises a polymeric structure having a 1½ inch horizontal offset in the center, the bottom 1½ inch long vertical portion of the marker would secure to the tailgate at the top inside edge with two self tapping screws. The device extends outward over the top of the tailgate and then angles back upward to serve as a clear visual marker for the truck operator looking backward through the rear window.

The second variation would be a 3 inch tall upright marker that includes a 1½ inch tall extension or offset at the front bottom side. This variation is mounted from the upper outside edge of an upright tailgate.

2. Description of the Prior Art

There are other tailgate markers designed for the same purpose. Typical of these is U.S. Pat. No. 6,137,419 issued to Lennox et al. on Oct. 24, 2000.

Another patent was issued to Hensel on May 23, 2000 as U.S. Pat. No. 6,065,423. Yet another U.S. Pat. No. 5,076,636 was issued to Buck et al. on Dec. 31, 1991 and still yet another was issued on Feb. 16, 1999 to Burg as U.S. Pat. No. 5,871,254.

Another patent was issued to Deaver et al. on Sep. 5, 1989 as U.S. Pat. No. 4,863,213. Yet another U.S. Design Patent No. Des. 281,061 was issued to Tortolani on Oct. 22, 1985 and another U.S. Design Patent No. Des. 387,722 was issued to Fujinaka on Dec. 16, 1997.

U.S. Pat. No. 6,137,419

Inventor: Christina M. Lennox

Issued: Oct. 24, 2000

The pickup truck tailgate monitor includes a control panel mounted adjacent to an operator station in the cab of the truck. The control panel is connected to the master switch for the vehicle. A monitor switch on the control panel is closed to activate the monitor. If the monitor is operational, an indicator light of a first circuit is illuminated. A second circuit with an audible indicator is energized by a sensor switch that is closed. The sensor switch is closed when the tailgate is open. When the tailgate is closed, the sensor switch is open.

U.S. Pat. No. 6,065,423

Inventor: Raymond L. Hensel

Issued: May 23, 2000

An indicator device (1) for alerting the driver of a pickup truck to the orientation of the tailgate (10) includes an indicator rod (7), connected to a housing (4) that is attached to the truck tailgate (10). In the first embodiment, the indicator rod (7) can be rotationally retracted into the housing (4) and its position secured between retracted and extended positions with a threaded thumb screw (6). In a second embodiment, the indicator rod (107) slides in relation to a housing (104) attached to the vehicle tailgate (10), and the indicator rod (107) is secured between retracted and extended positions by a spring loaded plunger (106). In a third embodiment, an indicator rod (207) passes through channels (214, 216, and 218) in a block (212) and is frictionally held in place by the natural resilience of the indicator rod material. When the indicator (1) is in position, the indicator rod (7) extends outwardly such that the driver of the truck may view the position of the rod (7) allowing him to ascertain the position of the tailgate (10).

U.S. Pat. No. 5,076,636

Inventor: Douglas H. Buck

Issued: Dec. 31, 1991

Presented is a pickup truck tailgate mounted aerostabilizer wing that moves with the tailgate and is therefore out of the way when the tailgate is opened for cargo loading. The aerostabilizer wing is mounted distal from the tailgate by use of low drag airfoil shaped stanchions that are attached to forward and upper portions of the tailgate in the preferred embodiment. The nose of the aerostabilizer wing is angled down so that the aerostabilizer wing acts as a turning vane to direct pressurized air from an aerodynamic pressure front that builds up on the forward side of the tailgate at highway speeds up and out over the top of the tailgate thereby reducing drag. Due to its downward angled and at least partially airfoil shaped design, the aerostabilizer wing also places a downward force on the tailgate thus helping to stabilize the pickup truck when traveling forward. Limitations on the downward angle of the nose of the aerostabilizer wing and of the gap distance between the aerostabilizer wing and the tailgate are established. End treatments of the aerostabilizer wing in both spanwise and chordwise directions are also given. The instant invention aerostabilizer wing and its mounting stanchions are all, in their preferred embodiments, at least partially airfoil shaped to insure a simple yet strong and appealing structure that offers minimum aerodynamic resistance. An optional aerostabilizer wing insert that can extend the spanwise length of the aerostabilizer wing and can include a light or reflector is also offered.

U.S. Pat. No. 5,871,254

Inventor: Donald E. Burg

Issued: Feb. 16, 1999

An aerodynamic spoiler adapted to be mounted on the tailgate of a pickup truck to enhance stability under certain driving conditions and to reduce turbulence in the cargo box and further an aerodynamic spoiler having a generally hollow structure and having an open configuration facilitating securing to a mounting surface of a vehicle and a closed configuration after it has been secured and a structure and method of providing common components which can readily accommodate variations in vehicle width with minimal customization required.

U.S. Pat. No. 4,863,213

Inventor: Dann T. Deaver

Issued: Sep. 5, 1989

An aerodynamic spoiler adapted to be mounted on the tailgate of a pickup truck to enhance stability under certain driving conditions and to reduce turbulence in the cargo box and further an aerodynamic spoiler having a generally hollow structure and having an open configuration facilitating securing to a mounting surface of a vehicle and a closed configuration after it has been secured and a structure and method of providing common components which can readily accommodate variations in vehicle width with minimal customization required.

U.S. Pat. No. Des. 281,061

Inventor: Richard J. Tortolani

Issued: Oct. 22, 1985

The ornamental design for a truck tailgate bumper.

U.S. Pat. No. Des. 387,722

Inventor: Marvin Fujinaka

Issued: Dec. 16, 1997

The ornamental design for a truck tailgate protector.

While these tailgate indication marker devices may be suitable for the purposes for which they were designed, they would not be as suitable for the purposes of the present invention, as hereinafter described.

SUMMARY OF THE PRESENT INVENTION

The present invention discloses a tailgate position indication marker that is mounted to the rear upper portion of a vehicle tailgate and is provided in two embodiments/variations. The first embodiment/variation comprises a polymeric structure having a 1½ inch horizontal offset in the center, the bottom 1½ inch long vertical portion of the marker would secure to the tailgate at the top inside edge with two self tapping screws or tape. The device extends outward over the top of the tailgate and then angles back upward to serve as a clear visual marker for the truck operator looking backward through the rear window. The second embodiment/variation would be a 3 inch tall upright marker that includes a 1½ inch tall extension or offset at the front bottom side. This variation is mounted from the upper outside edge of an upright tailgate.

A primary object of the present invention is to provide a tailgate position indication marker.

Another object of the present invention is to provide a tailgate position indication marker that is mounted to the rear upper portion of a vehicle tailgate.

Yet another object of the present invention is to provide a tailgate position indication marker that is mounted to the rear upper portion of a vehicle tailgate and is provided in two variations.

Still yet another object of the present invention is to provide a first variation comprises a polymeric structure having a 1½ inch horizontal offset in the center, the bottom 1½ inch long vertical portion of the marker would secure to the tailgate at the top inside edge with two self tapping screws. The device extends outward over the top of the tailgate and then angles back upward to serve as a clear visual marker for the truck operator looking backward through the rear window.

Another object of the present invention is to provide a second variation would be a 3 inch tall upright marker that includes a 1½ inch tall extension or offset at the front bottom side. This variation is mounted from the upper outside edge of an upright tailgate.

Additional objects of the present invention will appear as the description proceeds.

The present invention overcomes the shortcomings of the prior art by providing a tailgate position indication marker that is mounted to the rear upper portion of a vehicle tailgate and is provided in two variations. The first variation comprises a polymeric structure having a 1½ inch horizontal offset in the center, the bottom 1½ inch long vertical portion of the marker would secure to the tailgate at the top inside edge with two self tapping screws. The device extends outward over the top of the tailgate and then angles back upward to serve as a clear visual marker for the truck operator looking backward through the rear window. The second variation would be a 3 inch tall upright marker that includes a 1½ inch tall extension or offset at the front bottom side. This variation is mounted from the upper outside edge of an upright tailgate.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.
- 10 present invention
- 11 first variation
- 12 second variation
- 14 pickup truck
- 15 pickup truck mirrors
- 16 cover
- 18 tailgate
- 20 rear of pickup
- 22 safety hazard
- 24 driver
- 26 offset portion
- 28 vertical portion
- 30 vertical portion
- 32 offset portion
- 34 mounting apertures
- 36 screws
- 38 marker
- 39 safety ball
- 40 snap
- 42 double sided tape
- 44 sight lines

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
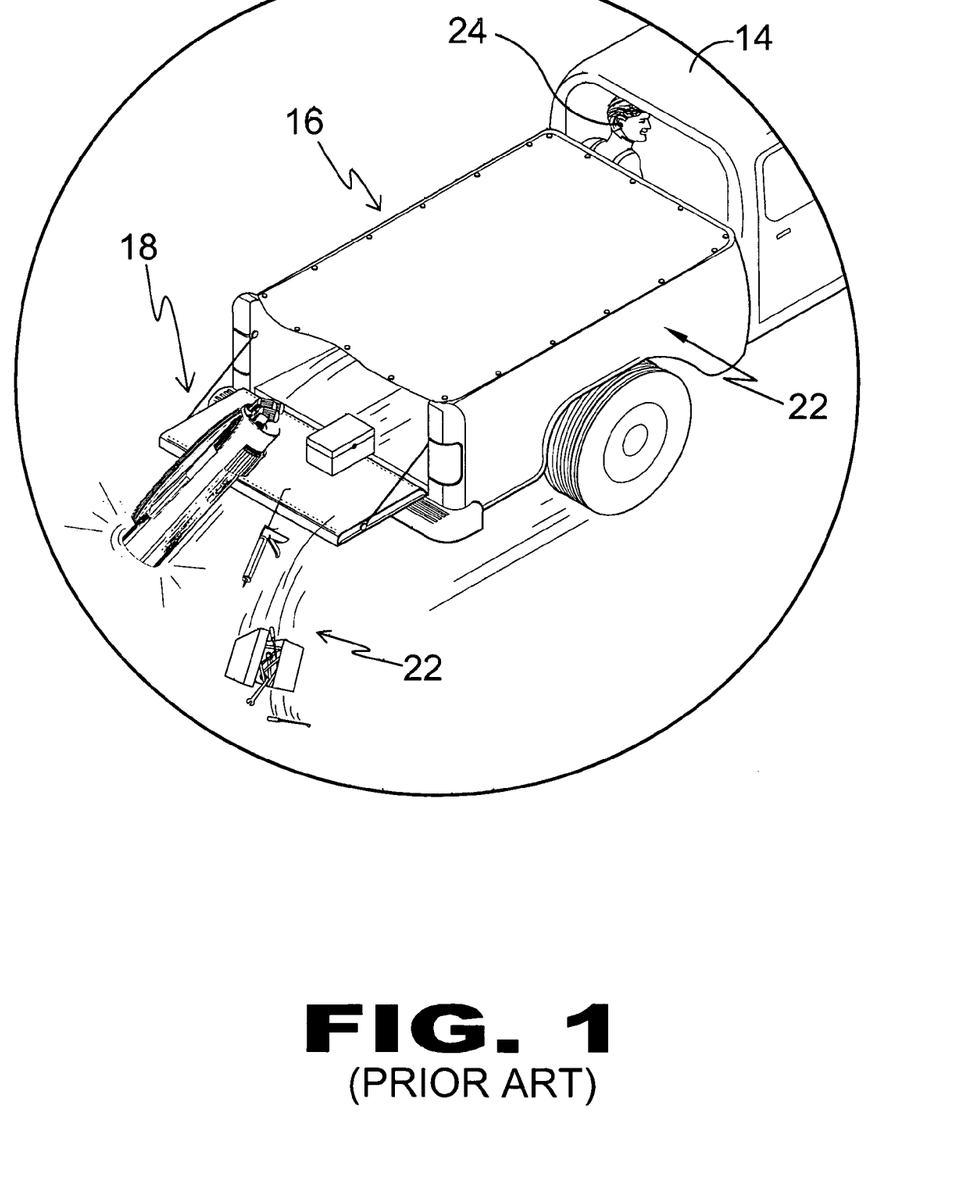
FIG. 1 is an illustrative view of prior art.

Turning to FIG. 1, shown therein is an illustrative view of prior art. A problem with driving pickup trucks 14 and SUV type vehicles having caps or tonneau covering 16 is driving off with the tail gate 18 in a lowered position and having possessions toppling out the rear 20 creating a serious safety hazard at 22 for following drivers. This problem is that the driver 24 has virtually no view to the tailgate 18 from the driver's seat because the cap or tonneau covering 16 conceals the tailgate. The present invention overcomes this problem by providing an attention getting marker raised to alert the driver 24 that the tailgate 18 is indeed secured and in the upright position.

Figure 2:
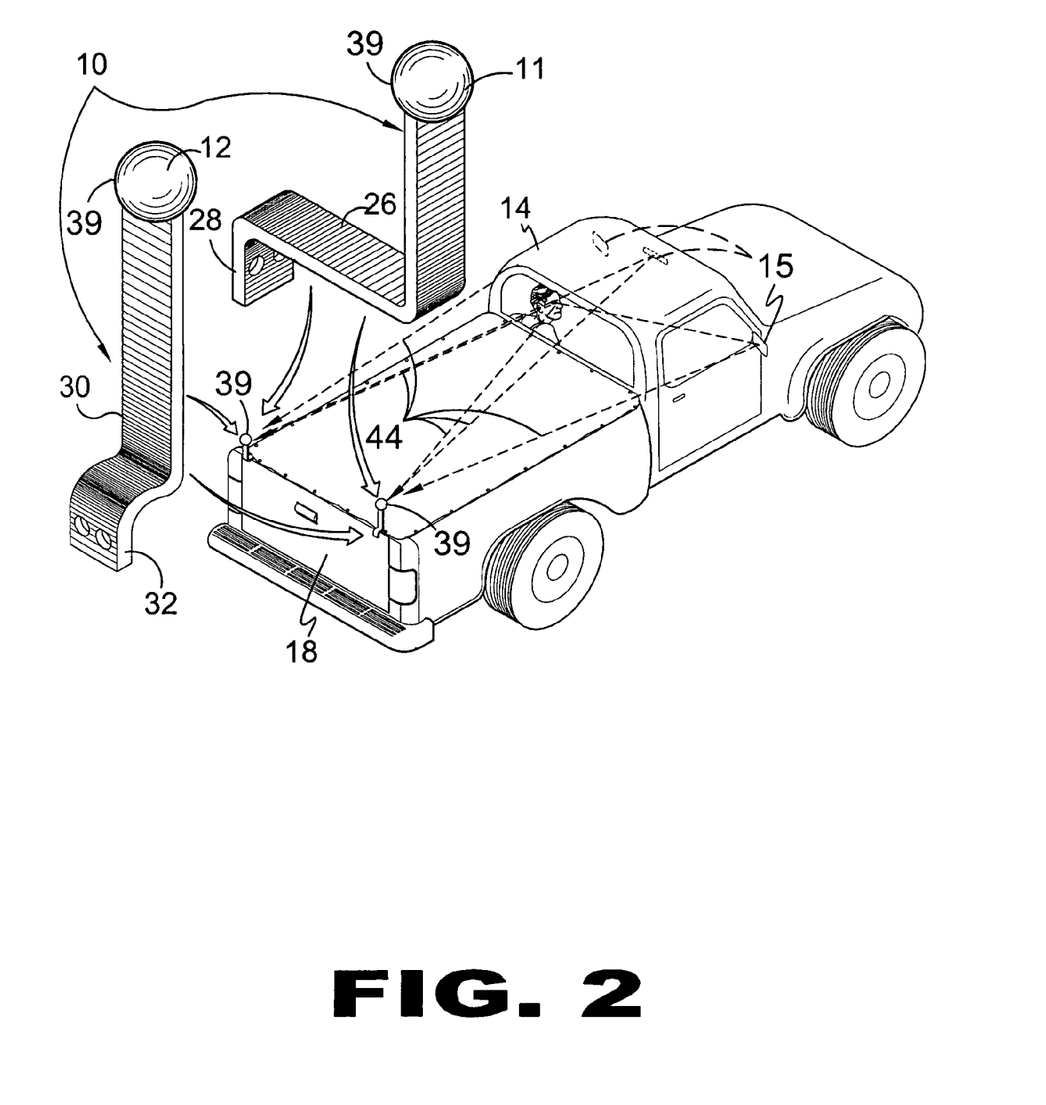
FIG. 2 is an illustrative view of the present invention in use.

Turning to FIG. 2, shown therein is an illustrative view of the present invention 10 in use. The present invention 10 disclosed a tailgate position indication marker that is mounted to the rear upper portion of a vehicle 14 tailgate 18 and is provided in two embodiments/variations 11, 12. The first embodiment/variation 11 comprises a polymeric structure having a 1½ inch horizontal offset 26 in the center so that the bottom 1½ inch long vertical portion 28 of the marker would secure to the tailgate at the top inside edge with two self tapping screws. The device 11 extends outward over the top of the tailgate 18 and then angles back upward to serve as a clear visual marker for the truck operator 24 looking backward through the rear window or vehicle mirrors 15 along sight lines 44. The second embodiment/variation 12 would be a 3 inch tall vertical or upright marker 30 that includes a 1½ inch tall extension or offset 32 at the front bottom side. This variation 12 is mounted from the upper outside edge of an upright tailgate 18. Each of the embodiments/variations has a ball-like structure 39 positioned on the top end as a safety measure from sharp edges and can also serve as a tailgate handle.

Figure 3:
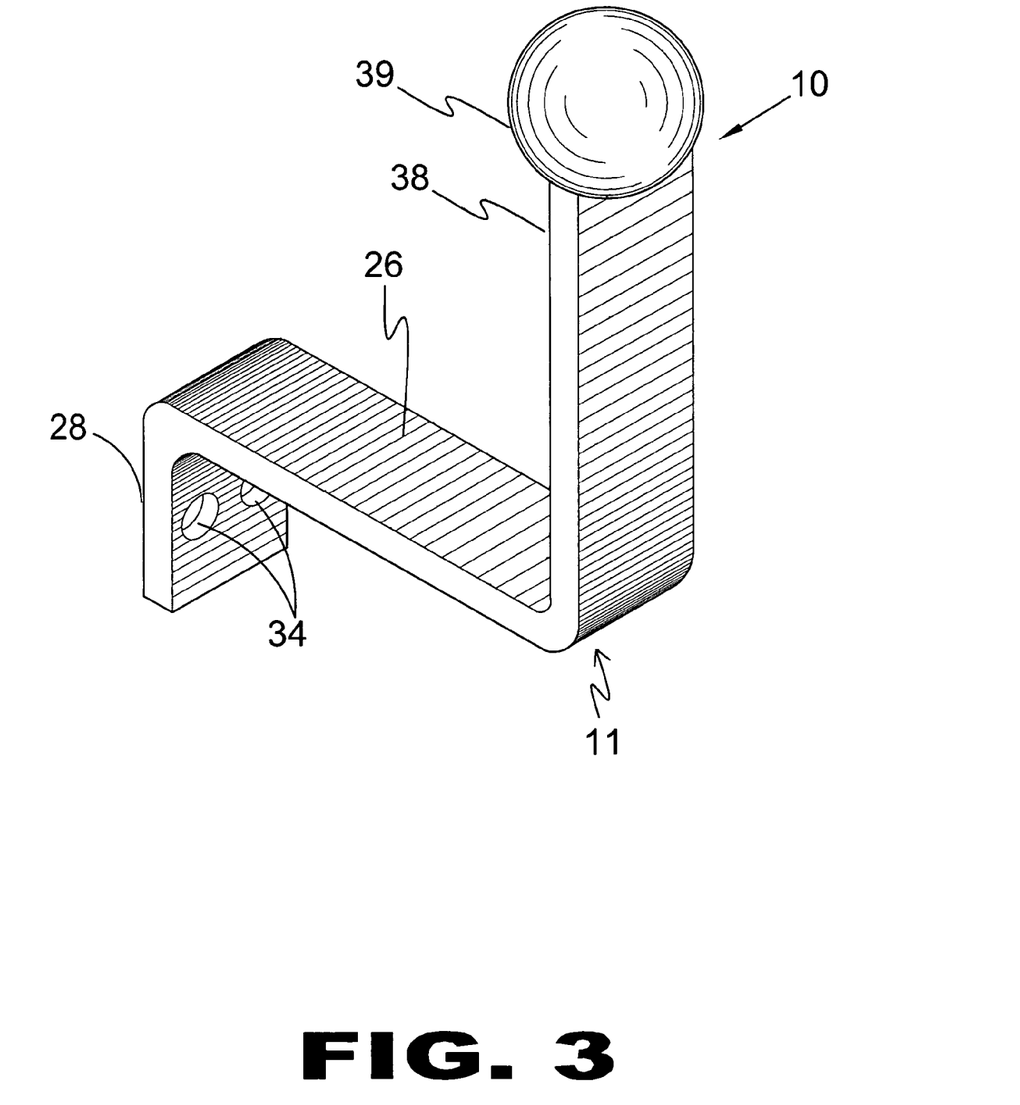
FIG. 3 is a perspective view of the first variation of the present invention.

Turning to FIG. 3, shown therein is a perspective view of the first variation 11 of the present invention 10. Shown is the first variation 11 of the present invention 10 disclosing a tailgate position indication marker 38 that is mounted to the rear upper portion of a vehicle tailgate and comprises a polymeric structure having a 1½ inch horizontal offset 26 in the center so that the bottom 1½ inch long vertical portion 28 of the marker would secure to the tailgate at the top inside edge with two self tapping screws in mounting apertures 34 or double back tape as an alternate. The device 11 extends outward over the top of the tailgate and then angles back upward terminating in ball 39 to serve as a clear visual marker for the truck operator looking backward through the rear window or vehicle mirrors 15 providing a plurality of sight lines 44. When the tailgate is in a lowered position the marker 11 is not visible. When the tailgate is in a raised position the marker 11 is visible to the driver.

Figure 4:
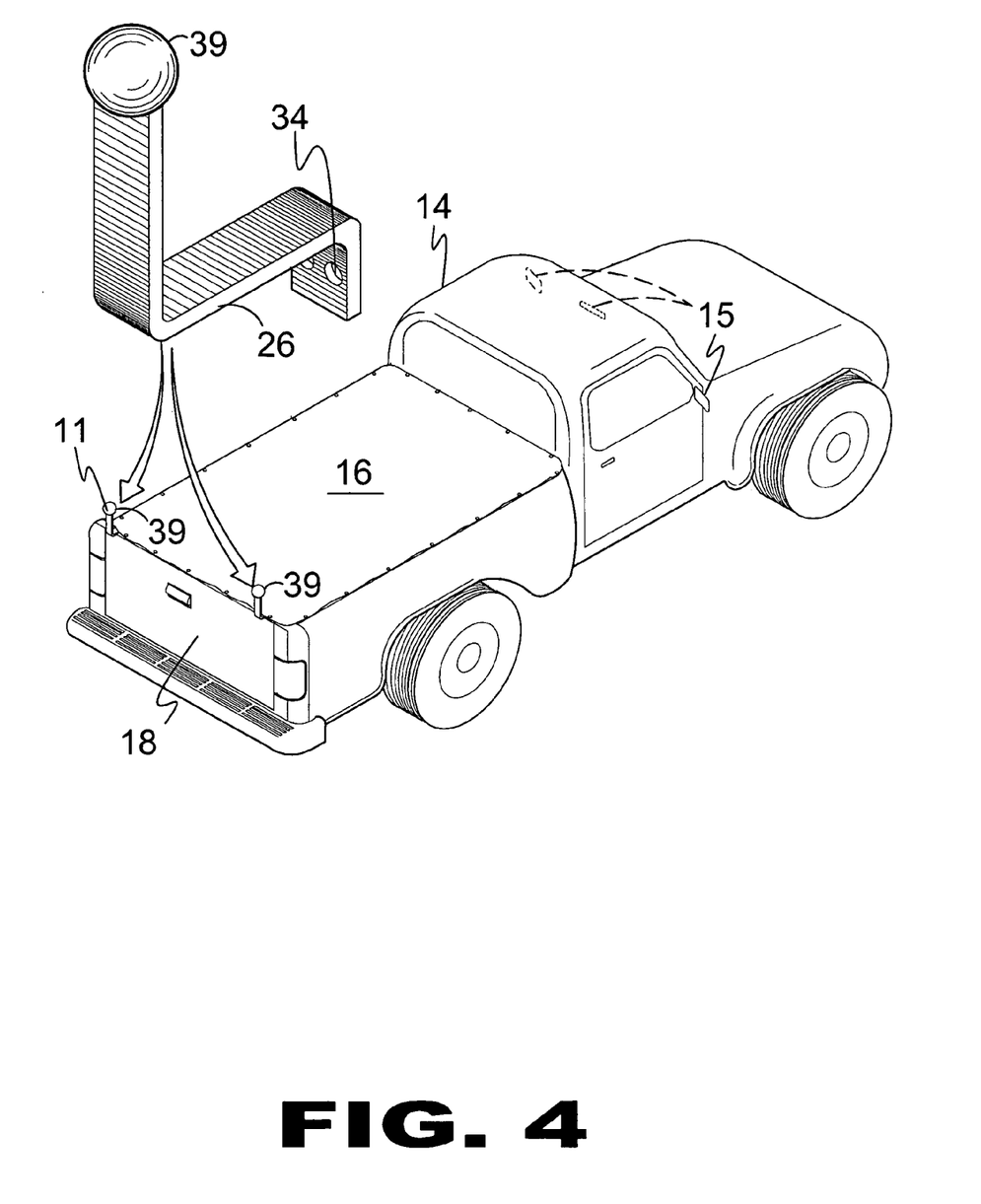
FIG. 4 is an illustrative view of the first variation of the present invention in use.

Turning to FIG. 4, shown therein is an illustrative view of the first variation 11 of the present invention in use with tailgate 18 raised. Shown is the first variation 111 of the present invention disclosing a tailgate position indication marker that is mounted to the rear upper portion of a vehicle 14 tailgate 18 and comprises a polymeric structure having a 1½ inch horizontal offset 26 in the center, the bottom 1½ inch long vertical portion of the marker would secure to the tailgate at the top inside edge with two self tapping screws in apertures 34 or double back tape as an alternate. The device 11 extends outward over the top of the tailgate 18 and then angles back upward terminating in ball 39 to serve as a clear visual marker for the truck operator looking backward through the rear window or vehicle mirrors 15 providing a plurality of sight lines. Cover 16 is also shown.

Figure 5:
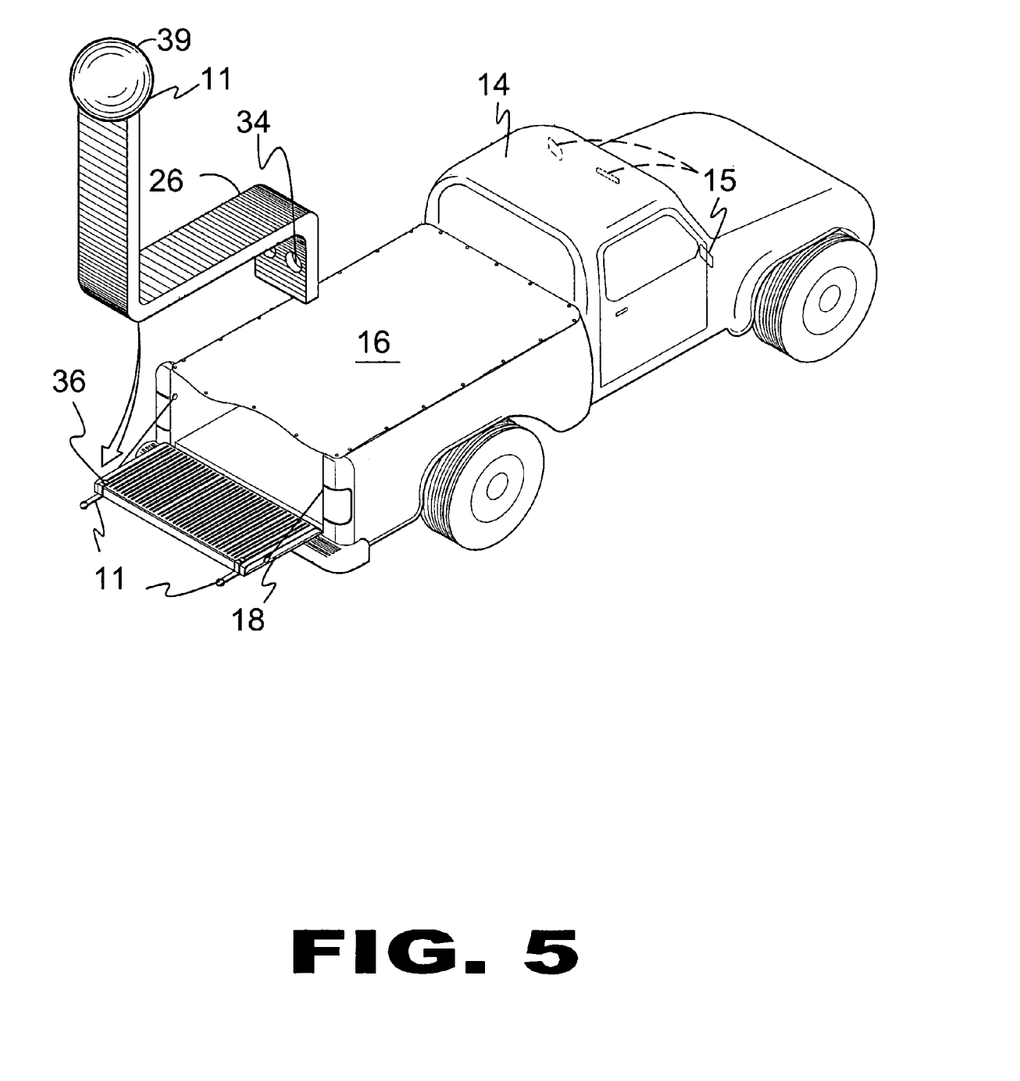
FIG. 5 is an illustrative view of the first variation of the present invention in use.

Turning to FIG. 5, shown therein is an illustrative view of the first variation 11 of the present invention in use. Shown is the first variation 11 of the present invention disclosing a tailgate position indication marker that is mounted to the rear upper portion of a vehicle 14 tailgate 18 and comprises a polymeric structure having a 1½ inch horizontal offset 26 in the center, the bottom 1½ inch long vertical portion of the marker would secure to the tailgate at the top inside edge with two self tapping screws 36 in apertures 34 or double back tape as an alternate. The device 11 extends outward over the top of the tailgate 18 and then angles back upward to serve as a clear visual marker for the truck operator looking backward through the rear window. Cover 16 is also shown.

Figure 6:
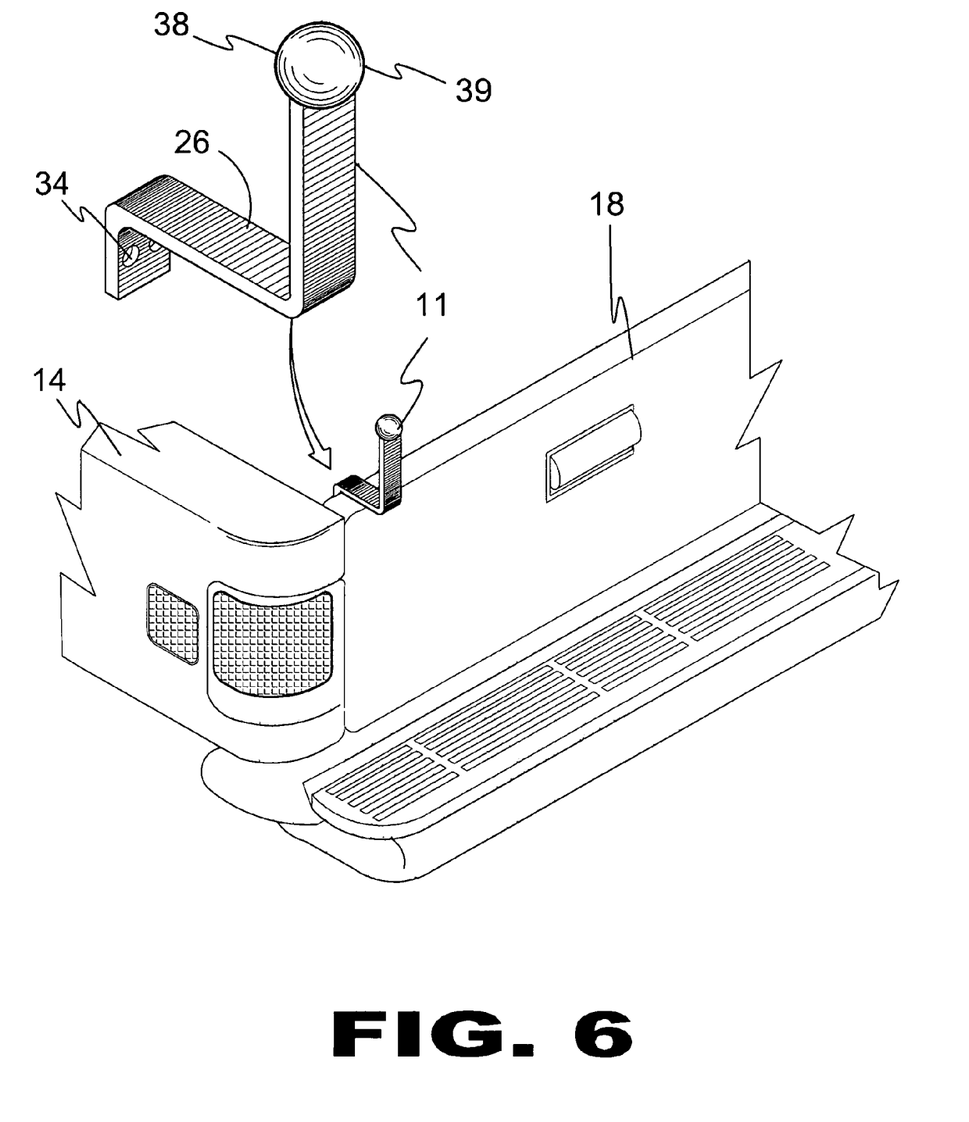
FIG. 6 is a detailed view of the first variation of the present invention.

Turning to FIG. 6, shown therein is a detailed view of the first variation 11 of the present invention. Shown is the first variation 11 of the present invention disclosing a tailgate position indication marker 38 that is mounted to the rear upper portion of a vehicle 14 tailgate 18 (one on each side) and comprises a polymeric structure having a 1½ inch horizontal offset 26 in the center, the bottom 1½ inch long vertical portion of the marker would secure to the tailgate at the top inside edge with two self tapping screws in apertures 34 or double back tape as an alternate. The device 11 extends outward over the top of the tailgate and then angles back upward to serve as a clear visual marker for the truck operator looking backward through the rear window.

Figure 7:
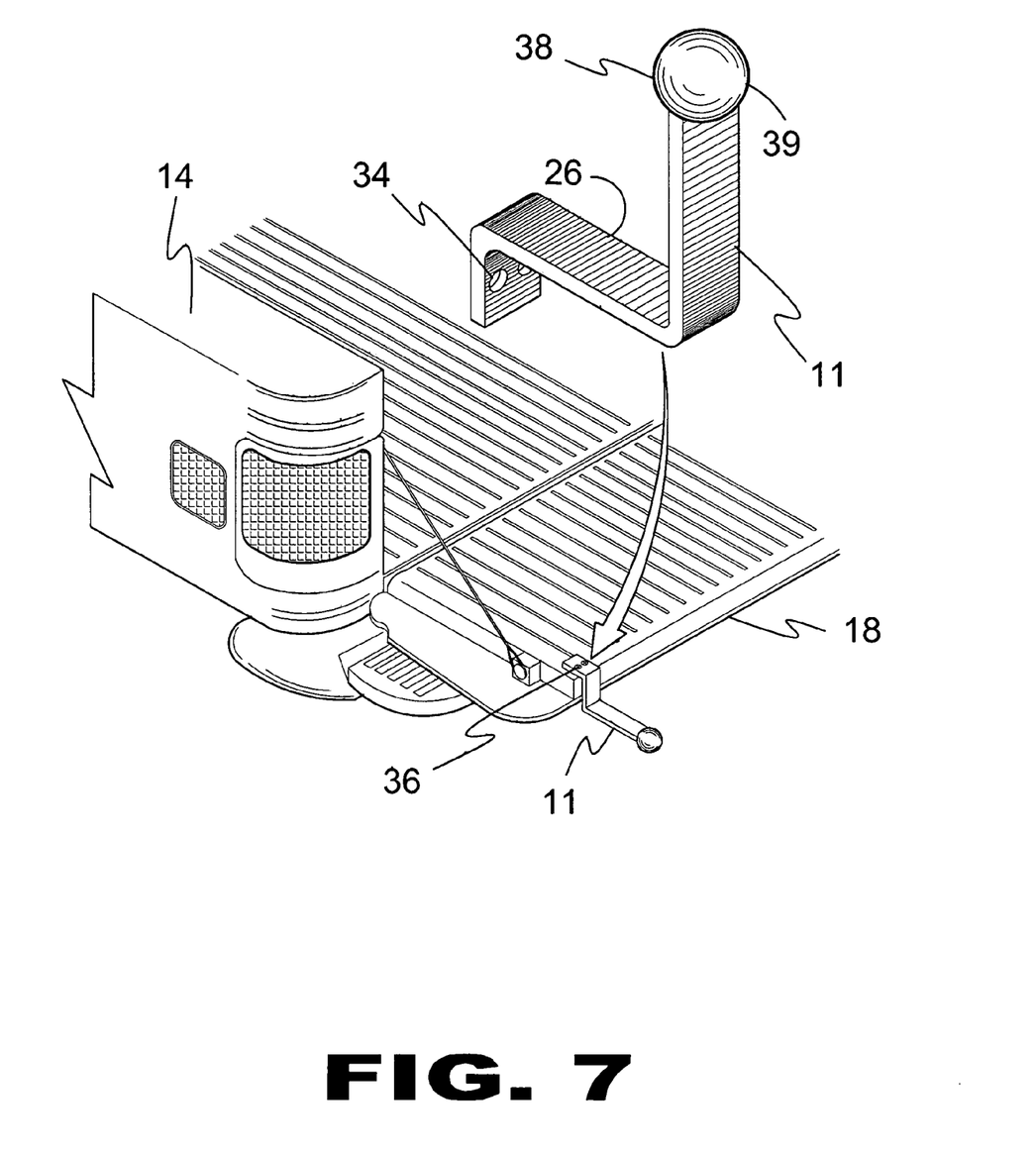
FIG. 7 is a detailed view of the first variation of the present invention.

Turning to FIG. 7, shown therein is a detailed view of the first variation 11 of the present invention with tailgate 18 lowered. Shown is the first variation 11 of the present invention, a tailgate position indication marker 38 that is mounted to the rear upper portion of a vehicle 14 tailgate 18 and comprises a polymeric structure having a 1½ inch horizontal offset 26 in the center, the bottom 1½ inch long vertical portion of the marker would secure to the tailgate at the top inside edge with two self tapping screws 36 in apertures 34 or double back tape as an alternate. The device 11 extends outward over the top of the tailgate 18 and then angles back upward to serve as a clear visual marker for the truck operator looking backward through the rear window.

Figure 8:
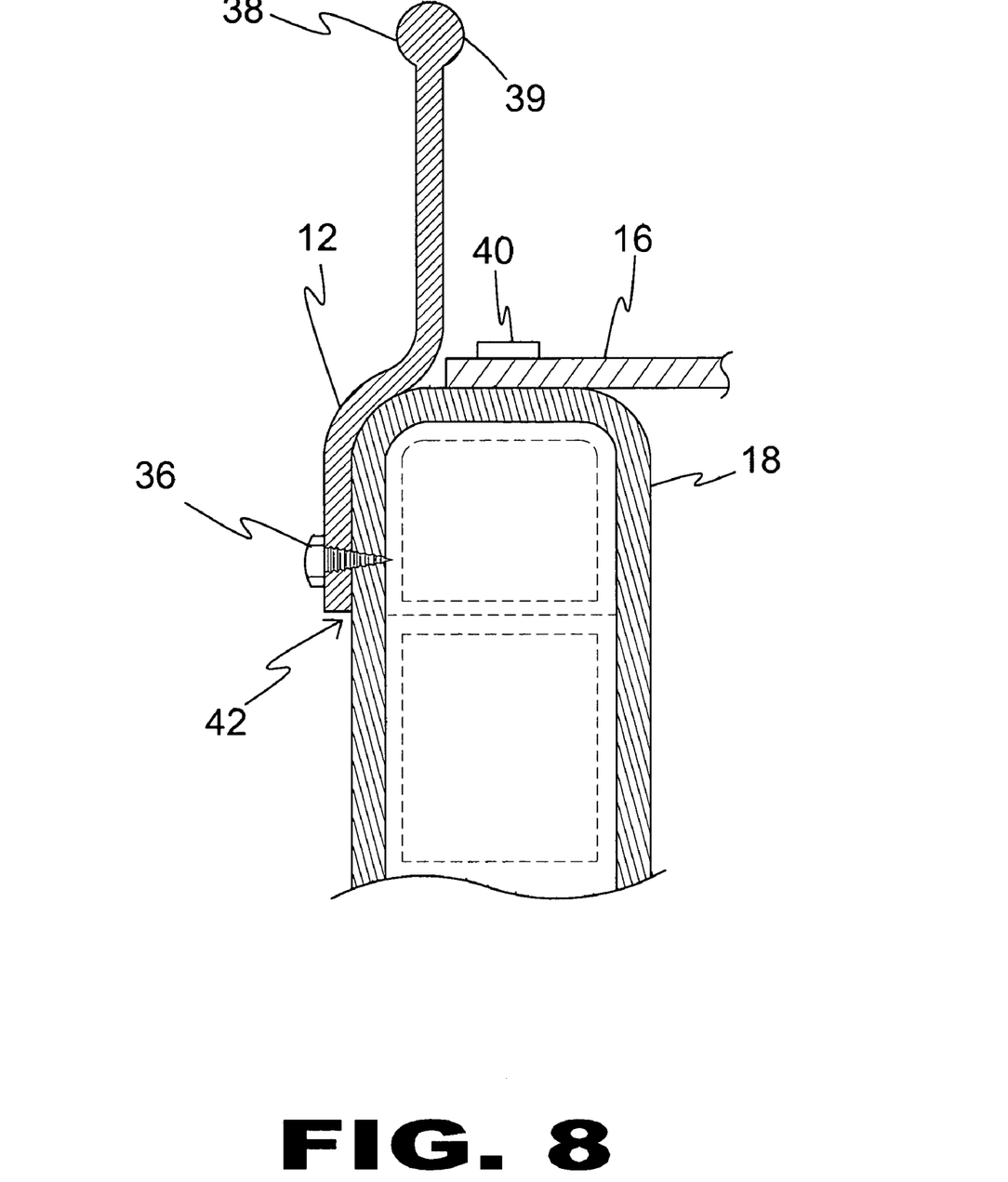
FIG. 8 is a sectional view of the first variation of the present invention.

Turning to FIG. 8, shown therein is a sectional view of the second variation 12 of the present invention. Shown is the first variation 12 of the present invention disclosing a tailgate position indication marker 38 that is mounted to the rear upper portion of a vehicle tailgate 18 (one on each side) and comprises a 3 inch tall upright marker 30 that includes a 1½ inch tall extension or offset 32 at the front bottom side. This variation is mounted from the upper outside edge of an upright tailgate. Also shown are cover 16, snap 40, screw 36 and double sided tape at 42.

Figure 9:
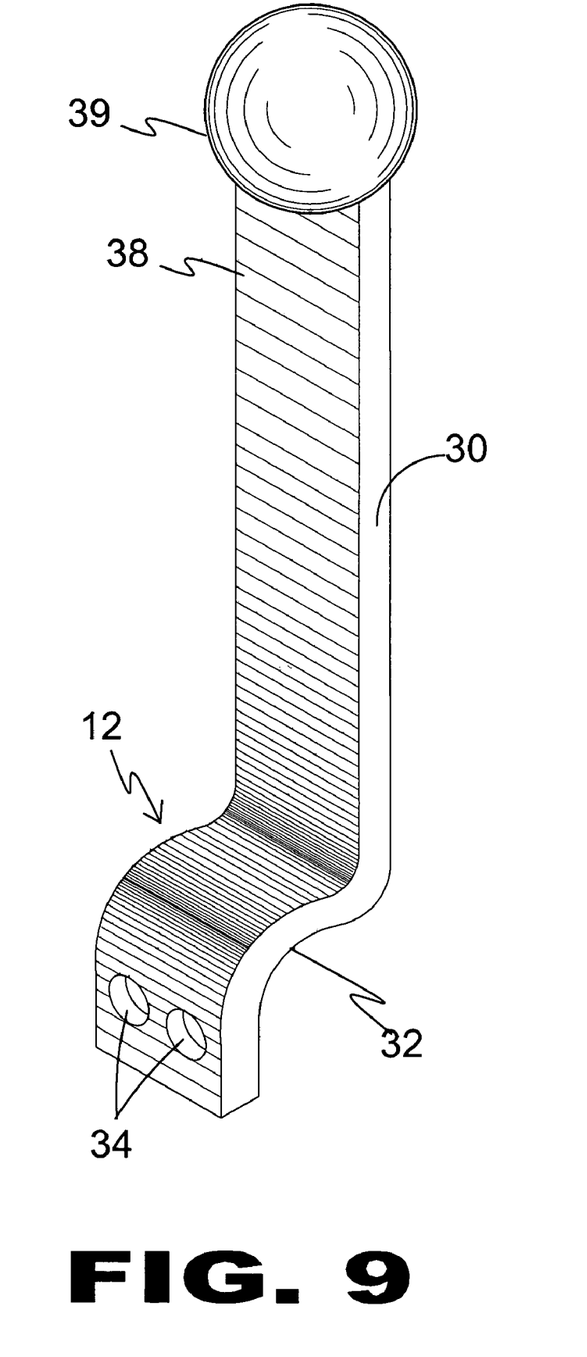
FIG. 9 is a perspective view of the second variation of the present invention.

Turning to FIG. 9, shown therein is a perspective view of the second variation 12 of the present invention. Shown is the second variation 12 of the present invention disclosing a tailgate position indication marker 38 that is mounted to the rear upper portion of a vehicle tailgate and would be a 3 inch tall upright marker 30 that includes a 1½ inch tall extension or offset 32 at the front bottom side. This variation is mounted from the upper outside edge of an upright tailgate. By looking backward through the rear window, the driver could instantly determine if the tailgate is lowered or raised. With the tail gate down, the marker would not be seen. When the tailgate is in the raised position the driver can visually see the marker. Apertures 34 are also shown.

Figure 10:
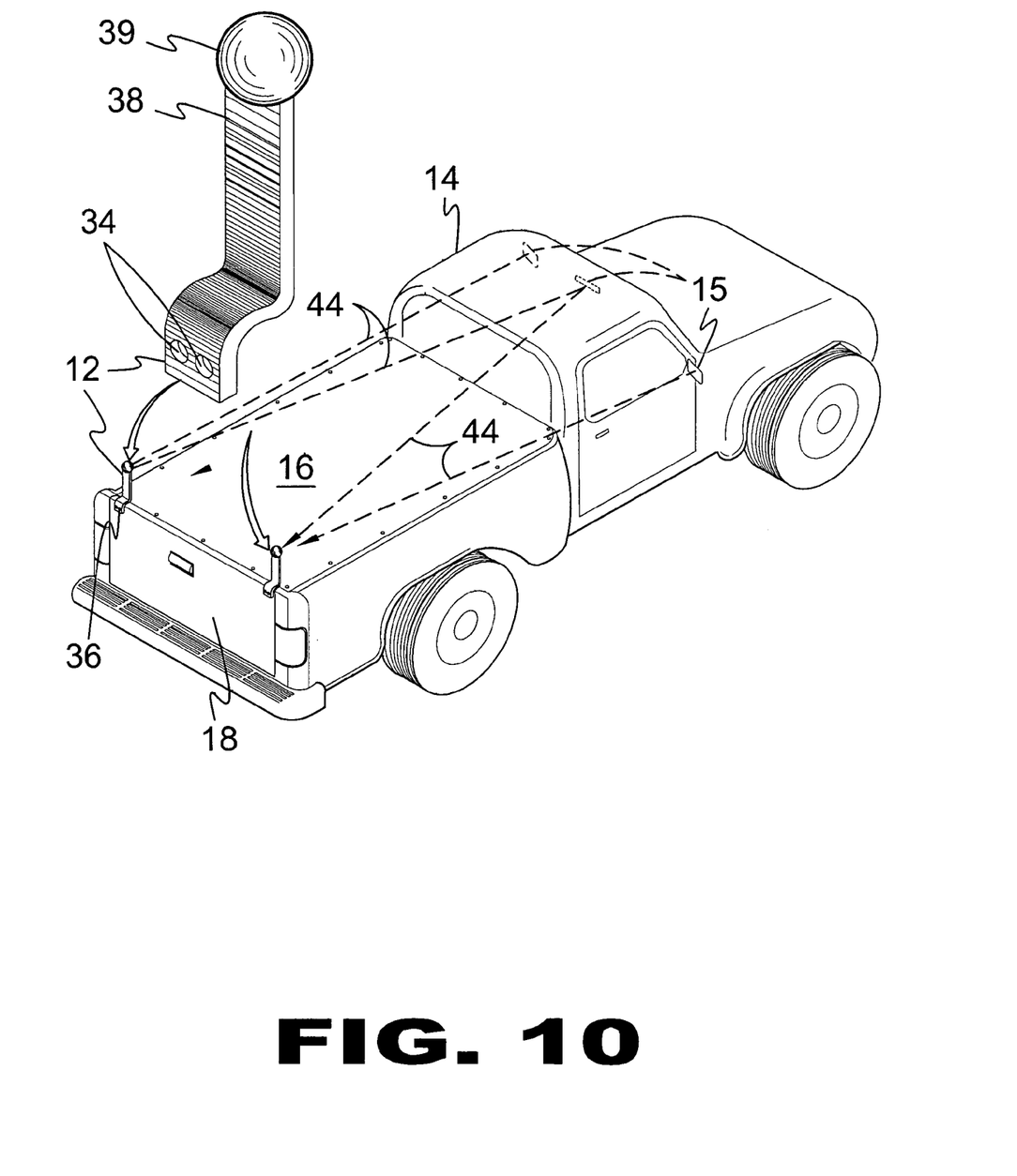
FIG. 10 is an illustrative view of the second variation of the present invention in use.

Turning to FIG. 10, shown therein is an illustrative view of the second variation 12 of the present invention in use with tailgate 18 raised. Shown is the second variation 12 of the present invention disclosing a tailgate position indication marker 38 that is mounted to the rear upper portion of a vehicle 14 tailgate 18 (one on each side) and would be a 3 inch tall upright marker that includes a 1½ inch tall extension or offset at the front bottom side. This variation is mounted at apertures 34 from the upper outside edge of an upright tailgate 18. By looking backward through the rear window, the driver could instantly determine if the tailgate 18 is lowered or raised. Cover 16 and screws 36 are also shown.

Figure 11:
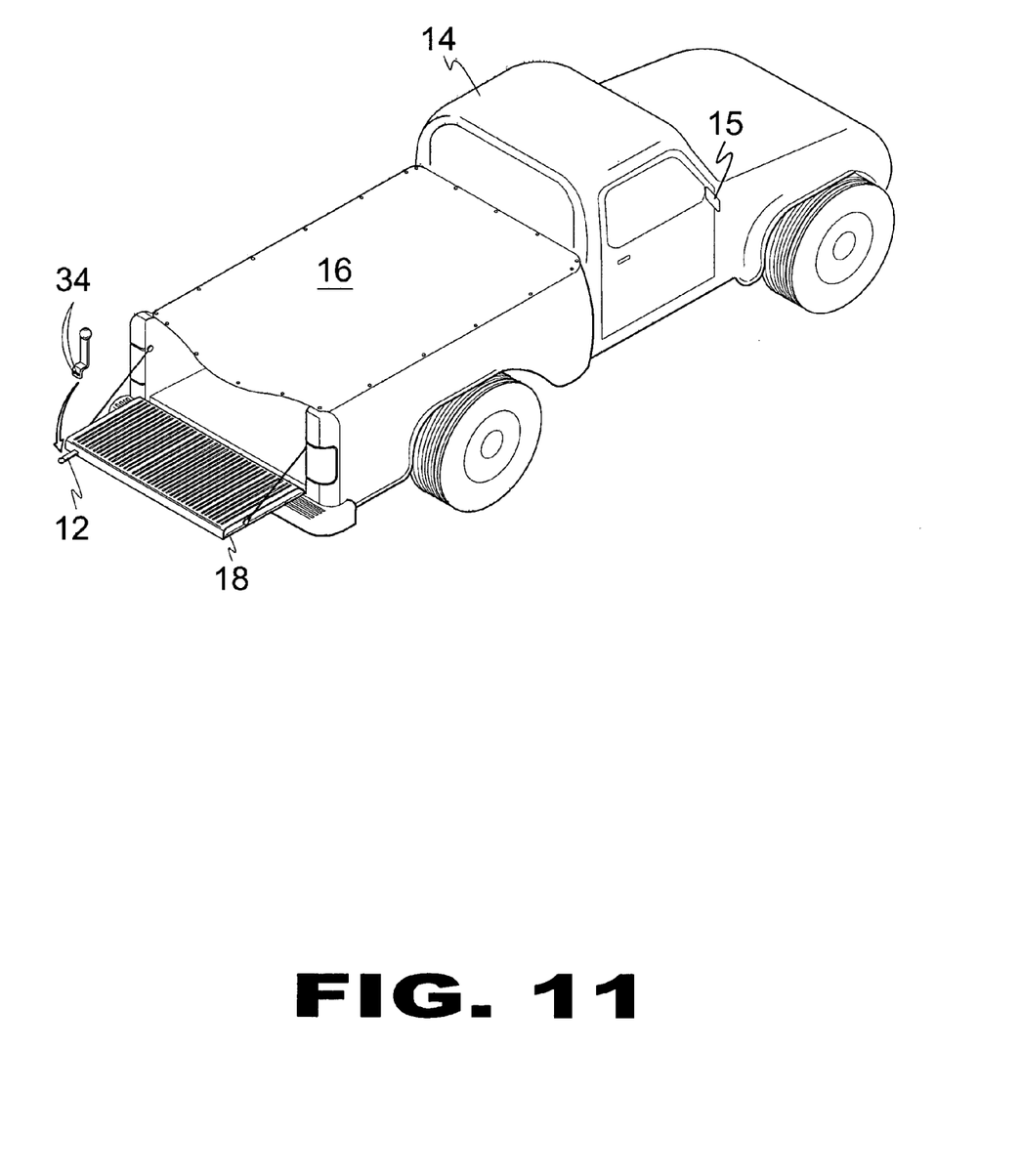
FIG. 11 is an illustrative view of the second variation of the present invention in use.

Turning to FIG. 11, shown therein is an illustrative view of the second variation 12 of the present invention in use with tailgate 18 lowered. Shown is the second variation 12 of the present invention disclosing a tailgate position indication marker that is mounted to the rear upper portion of a vehicle 14 tailgate 18 and would be a 3 inch tall upright marker that includes a 1½ inch tall extension or offset at the front bottom side. This variation 12 is mounted from the upper outside edge of an upright tailgate 18. By looking backward through the rear window, the driver could instantly determine if the tailgate is lowered or raised. Also shown are cover 16 and apertures 34.

Figure 12:
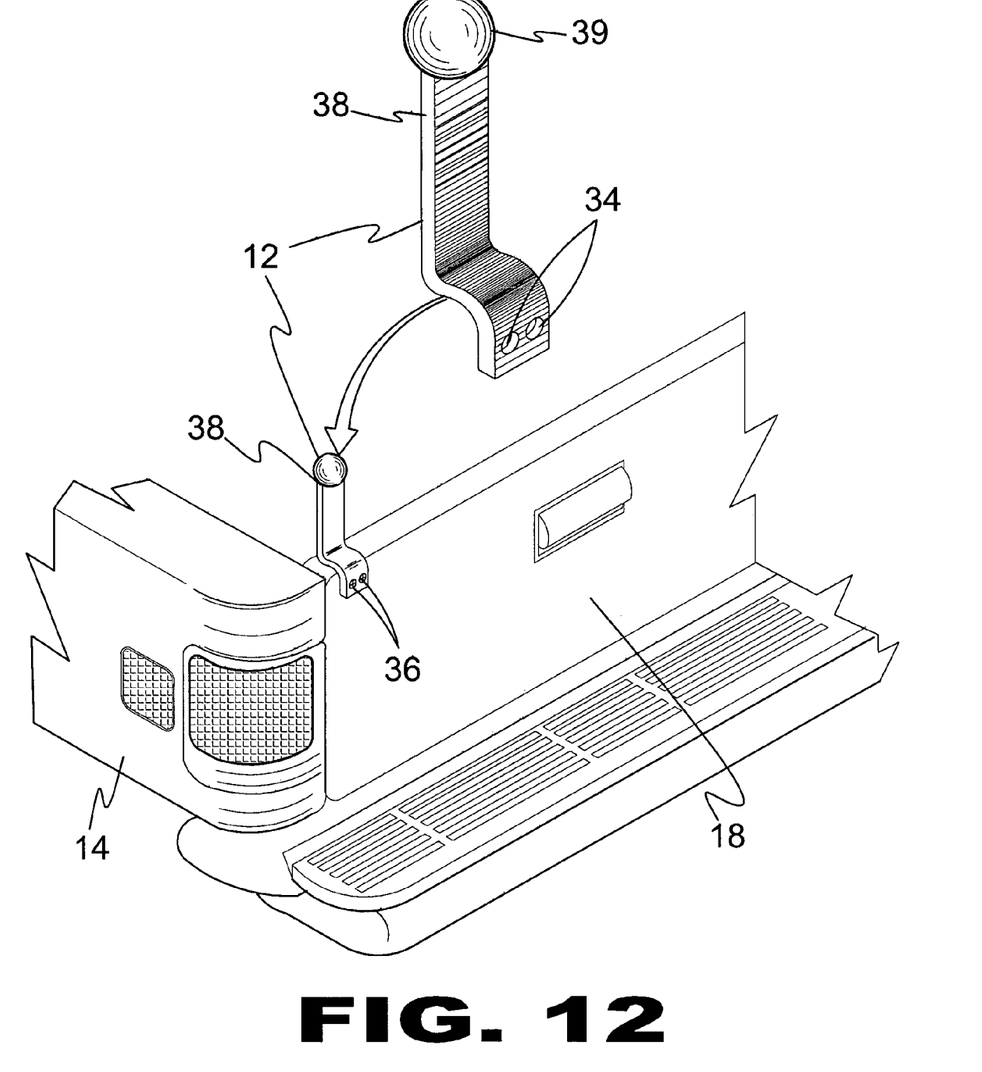
FIG. 12 is a detailed view of the second variation of the present invention.

Turning to FIG. 12, shown therein is a detailed view of the second variation 12 of the present invention. Shown is the second variation 12 of the present invention disclosing a tailgate position indication marker that is mounted to the rear upper portion of a vehicle 14 tailgate 18 and would be a 3 inch tall upright marker 38 that includes a 1½ inch tall extension or offset at the front bottom side. This variation 12 is mounted from the upper outside edge of an upright tailgate. By looking backward through the rear window, the driver could instantly determine if the tailgate is lowered or raised. Also shown are fasteners or screws 36 and apertures 34.

Figure 13:
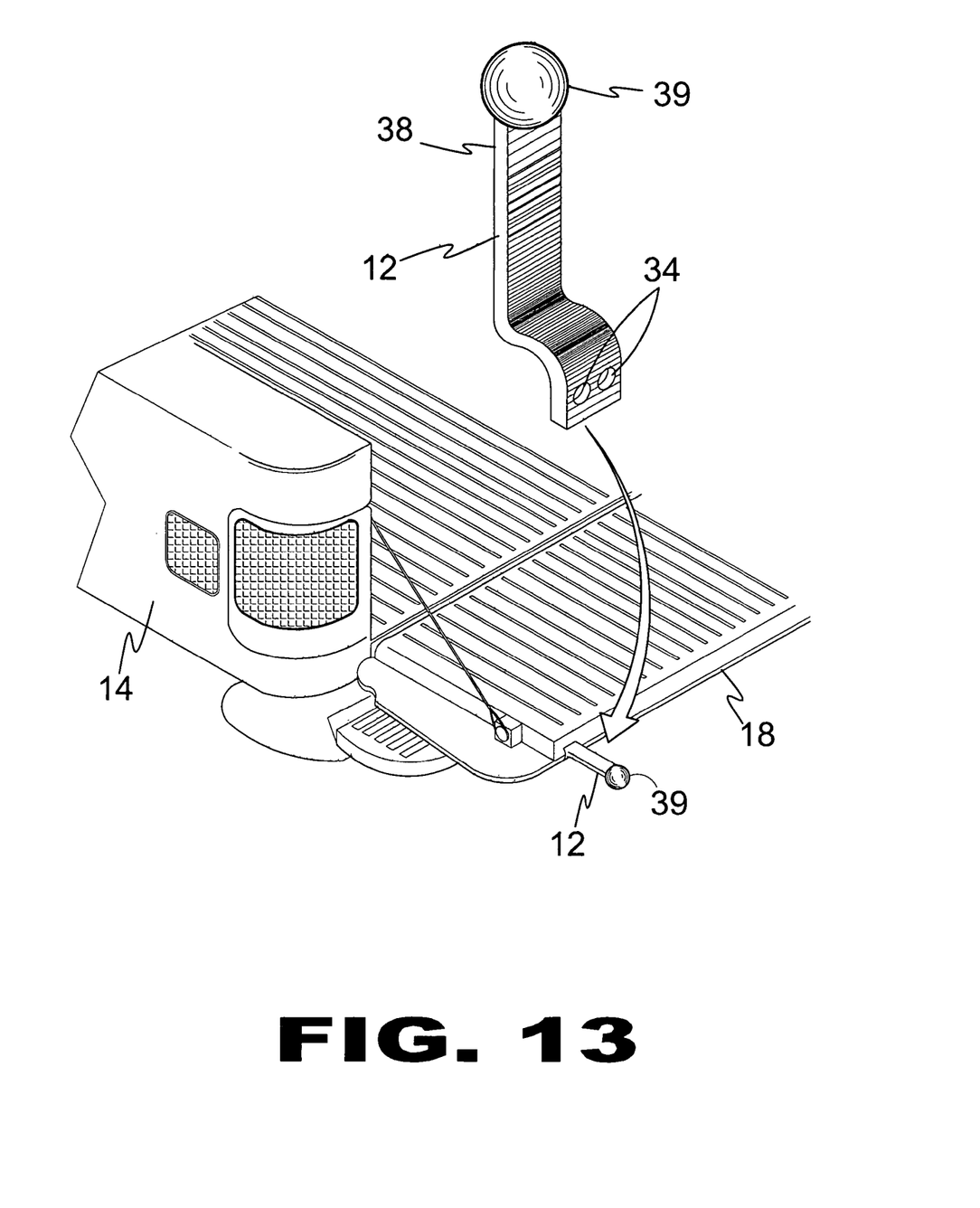
FIG. 13 is a detailed view of the second variation of the present invention.

Turning to FIG. 13, shown therein is a detailed view of the second variation 12 of the present invention. Shown is the second variation 12 of the present invention disclosing a tailgate position indication marker 38 that is mounted to the rear upper portion of a vehicle 14 tailgate 18 and would be a 3 inch tall upright marker 38 that includes a 1½ inch tall extension or offset at the front bottom side. This variation 12 is mounted from the upper outside edge of an upright tailgate 18. By looking backward through the rear window, the driver could instantly determine if the tailgate 18 is lowered or raised. Also shown are apertures 34.

Figure 14:
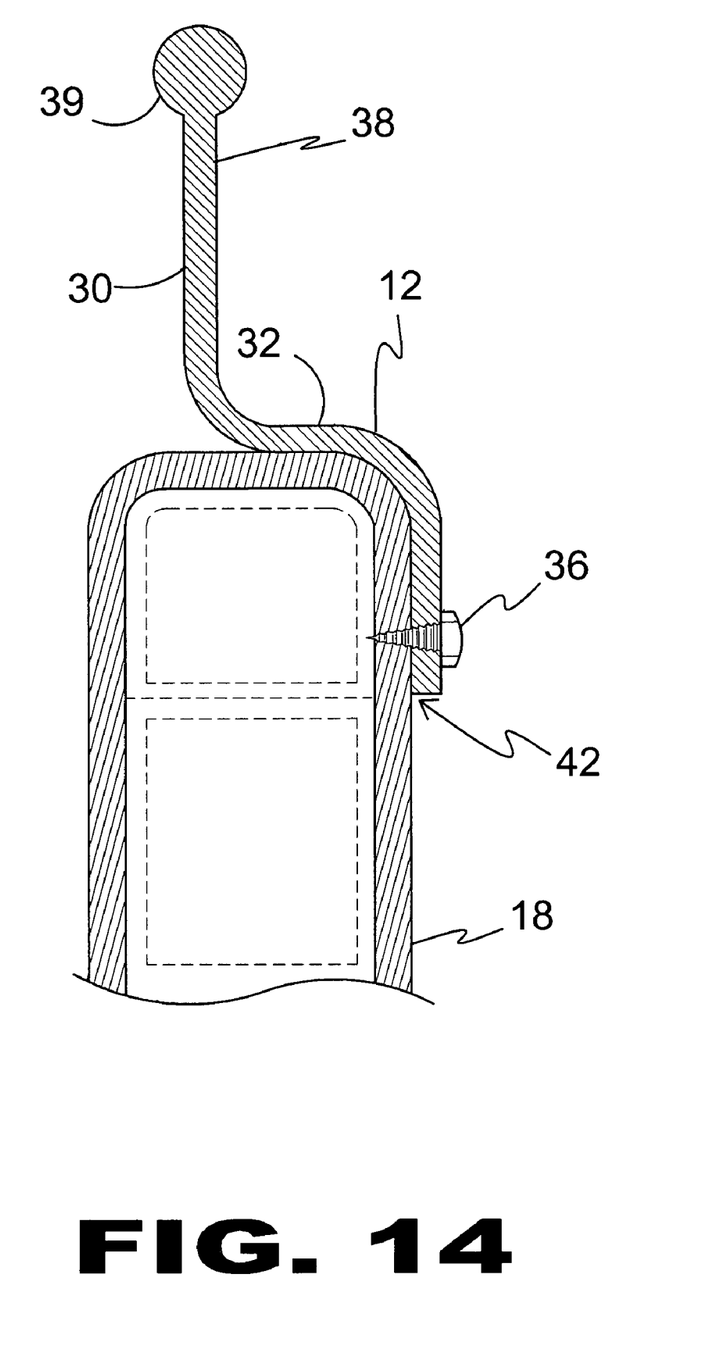
FIG. 14 is a sectional view of the second variation of the present invention.

Turning to FIG. 14, shown therein is a sectional view of the second variation 12 of the present invention. Shown is the second variation 12 of the present invention disclosing a tailgate position indication marker 38 that is mounted to the rear upper portion of a vehicle 14 tailgate 18 and would be a 3 inch tall upright 30 marker 38 that includes a 1½ inch tall extension or offset 32 at the front bottom side. This variation is mounted from the upper outside edge of an upright tailgate. By looking backward through the rear window, the driver could instantly determine if the tailgate is lowered or raised. Also shown are self topping screws 36 and double sided tape at 42.

I claim:

1. An apparatus in combination with and for providing an indicator for the position of the tailgate of a pickup truck, said pickup truck having a rear window mirror, a left side mirror, and a right side mirror, the tailgate having a top edge surface and inner and outer side surfaces, said top edge surface joining said inner and outer surfaces forming a rectangular top of said tailgate with rounded corners, comprising:
    a) first and second indicator members each having a flat lower portion, a flat middle portion at right angle to said lower portion, and a flat upper portion at right angle to said middle portion and parallel to said lower portion, and a ball shaped member mounted on an upper end of said upper portion;
    b) said lower portion of each indicator member being mounted on a side surface of said tailgate with said middle portion flush with said top edge surface and said upper portion extending out from said top edge surface of said tail gate, said indicator member having corners conforming to said corners of said rectangular top of said tailgate, said first and second indicator members being located on left and right sides, respectively, of said tail gate, said ball shaped member of said first indicator member being in the line of sight of said rear window mirror and said left side mirror, and said ball shaped member of said second indicator member being in the line of sight of said rear window mirror and said right side mirror when said tailgate is in an upright position whereby an operator of said pickup truck can ascertain from any of said mirrors that said tailgate is in the upright position; and,
    c) the flat lower, middle and upper portions of each said indicator member being made of a flat bar of material conforming to surfaces and shape of said tailgate.

2. The apparatus of claim 1, wherein said lower portion of each indicator member is attached by self tapping screws to said side surface of said tailgate.

3. The apparatus of claim 1, wherein said lower portion of each indicator member is attached by double back tape to said side surface of said tailgate.

4. The apparatus of claim 1, wherein each said indicator member is made of polymeric material.

5. The apparatus of claim 1, wherein each said lower portion is attached to the inner side surface of said tailgate.

6. The apparatus of claim 1, wherein each said lower portion is attached to the outer side surface of said tailgate.

7. A method for providing an indicator for the position of the tailgate of a pickup truck comprising the steps of:
   a) obtaining first and second indicator members, each said indicator member having a flat lower portion, a flat middle portion at right angle to said lower portion, and a flat upper portion at right angle to said middle portion and parallel to said lower portion, and a ball shaped member mounted on an upper end of said upper portion;
   b) attaching each said lower portion to a side surface of said tailgate with said middle portion flush with said top edge surface and said upper portion attending out from said top edge surface of said tail gate, each said indicator member having corners conforming to said corners of said rectangular top of said tailgate and the flat lower, middle and upper portions of said indicator member conforming to surfaces and shape of said tailgate, the first indicator member being placed on a left side of said tail gate and the second indicator member placed on a right side of said tail gate, said ball shaped member of said first indicator member being in the line of sight of a rear window mirror within said pickup truck and the line of sight with a left side view mirror on said truck, and said ball shaped member of said second indicator member being in the line of sight of said rear window mirror within said pickup truck and the line of sight with a right side view mirror on said truck, when said tailgate is in an upright position whereby an operator of said pickup truck can ascertain from any of said rear view mirror and said side view mirrors that said tailgate is in the upright position.

* * * * *